US012731013B2

(12) United States Patent
Kolhe et al.

(10) Patent No.: US 12,731,013 B2
(45) Date of Patent: Sep. 8, 2026

(54) WEIGHTED MATRIX FOR INPUT DATA STREAM

(71) Applicant: Hewlett Packard Enterprise Development LP, Houston, TX (US)

(72) Inventors: Jitendra Onkar Kolhe, Bangalore (IN); Soumitra Chatterjee, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 1182 days.

(21) Appl. No.: 17/234,995

(22) Filed: Apr. 20, 2021

(65) Prior Publication Data

US 2022/0198250 A1 Jun. 23, 2022

(30) Foreign Application Priority Data

Dec. 21, 2020 (IN) .......................... 2020041055652

(51) Int. Cl.

| | |
|---|---|
| ***G06N 3/063*** | (2023.01) |
| ***G06F 7/544*** | (2006.01) |
| ***G06F 9/50*** | (2006.01) |
| ***G06F 17/16*** | (2006.01) |

(52) U.S. Cl.

CPC ........... *G06N 3/063* (2013.01); *G06F 7/5443* (2013.01); *G06F 9/5027* (2013.01); *G06F 17/16* (2013.01)

(58) Field of Classification Search

CPC ............ G06N 3/063; G06N 3/00; G06N 3/02; G06N 3/06; G06N 3/065

See application file for complete search history.

(56) References Cited

U.S. PATENT DOCUMENTS

| | | | |
|---|---|---|---|
| 2001/0021271 A1* | 9/2001 | Ishibashi | G06T 9/007 382/232 |
| 2018/0341495 A1 | 11/2018 | Culurciello et al. | |
| 2019/0220709 A1* | 7/2019 | Freeman | G06N 3/08 |
| 2020/0034148 A1 | 1/2020 | Sumbul et al. | |
| 2020/0110984 A1 | 4/2020 | Chatterjee et al. | |
| 2022/0012013 A1* | 1/2022 | Sebastian | G06E 3/003 |

OTHER PUBLICATIONS

Jin, Jonghoon, Aysegul Dundar, and Eugenio Culurciello. "Flattened convolutional neural networks for feedforward acceleration." arXiv preprint arXiv:1412.5474. (Year: 2015).*

Ankit et al., "PUMA: A Programmable Ultra-efficient Memristor-based Accelerator for Machine Learning Inference", Jan. 30, 2019, 17 pages.

Bruel et al., "Generalize or Die: Operating Systems Support for Memristor-based Accelerators", (Research Paper), 2017 IEEE International Conference on Rebooting Computing (ICRC), Nov. 8-9, 2017, 8 Pages.

(Continued)

Primary Examiner — Kamran Afshar

(74) *Attorney, Agent, or Firm* — Fletcher Yoder, P.C.

(57) ABSTRACT

Examples of performing convolution operations based on a weighted matrix are described. In an example, an input data stream vector is processed using a weighted matrix stored onto a processing unit of a neural network accelerator. The weighted matrix may correspond to a first convolution filter and a second convolution filter.

20 Claims, 6 Drawing Sheets

(56) References Cited

OTHER PUBLICATIONS

Hu et al., "Dot-product engine for neuromorphic computing: Programming 1T1M crossbar to accelerate matrix-vector multiplication", Hewlett Packard Labs, 53nd ACM/EDAC/IEEE Design Automation Conference (DAC), Jun. 5-9, 2016, 6 pages.
Shen et al., "Maximizing CNN Accelerator Efficiency Through Resource Partitioning", (Research Paper), 2017 ACM/IEEE 44th Annual International Symposium on Computer Architecture (ISCA), Apr. 12, 2018, 13 Pgs.
Strachan et al., "The Dot-Product Engine (DPE): exploring high efficiency analog multiplication with memristorarrays", HPE, Dec. 11, 2015, 29 pages.
Zhang et al., "Mitigate Parasitic Resistance in Resistive Crossbar-based Convolutional Neural Networks", (Research Paper), ACM Journal on Emerging Technologies in Computing Systems, Dec. 17, 2019, 20 Pages.
Naoyuki Ichimura, "Accelerating Convolution Operations by GPU (CUDA), Part 1: Fundamentals with Example Code Using Only Global Memory", available online at <https://qiita.com/naoyuki_ichimura/items/8c80e67a10d99c2fb53c>, May 20, 2019,22 pages.
NVIDIA, "Convolution", available online at <https://developer.nvidia.com/discover/convolution>, 2025, 3 pages.
NVIDIA, "Convolutional Neural Network (CNN)", available online at <https://developer.nvidia.com/discover/convolutional-neural-network>, 2025, 4 pages.

* cited by examiner

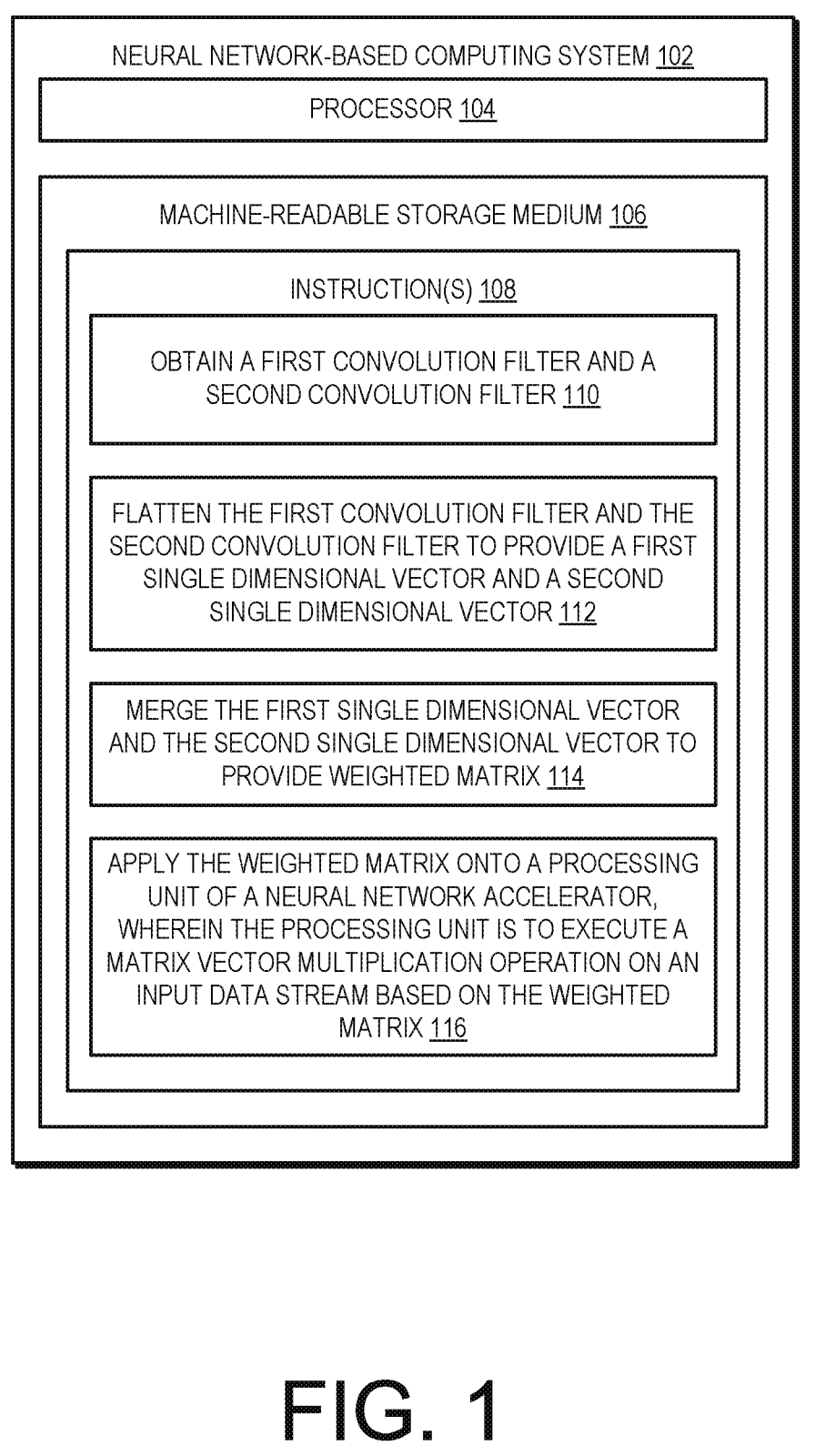

NEURAL NETWORK-BASED COMPUTING SYSTEM 102

PROCESSOR 104

MACHINE-READABLE STORAGE MEDIUM 106

INSTRUCTION(S) 108

OBTAIN A FIRST CONVOLUTION FILTER AND A SECOND CONVOLUTION FILTER 110

FLATTEN THE FIRST CONVOLUTION FILTER AND THE SECOND CONVOLUTION FILTER TO PROVIDE A FIRST SINGLE DIMENSIONAL VECTOR AND A SECOND SINGLE DIMENSIONAL VECTOR 112

MERGE THE FIRST SINGLE DIMENSIONAL VECTOR AND THE SECOND SINGLE DIMENSIONAL VECTOR TO PROVIDE WEIGHTED MATRIX 114

APPLY THE WEIGHTED MATRIX ONTO A PROCESSING UNIT OF A NEURAL NETWORK ACCELERATOR, WHEREIN THE PROCESSING UNIT IS TO EXECUTE A MATRIX VECTOR MULTIPLICATION OPERATION ON AN INPUT DATA STREAM BASED ON THE WEIGHTED MATRIX 116

FIG. 1

WEIGHTED MATRIX FOR INPUT DATA STREAM

BACKGROUND

Neural network-based computing systems enable complex tasks, which include comprehension, language translation, image recognition, or speech recognition. These systems, also referred to as neural network accelerators, may perform complex computations using matrix-vector multiplication. An example of a neural network-based computing systems is the Dot-Product Engine (DPE). DPE based systems include computing cores which comprise memristive crossbar arrays.

BRIEF DESCRIPTION OF FIGURES

Systems and/or methods, in accordance with examples of the present subject matter are now described, by way of example, and with reference to the accompanying figures, in which:

FIG. 1 illustrates a neural network-based computing system for performing convolution operations based on weighted matrix, as per an example;

DETAILED DESCRIPTION

Figure 2:
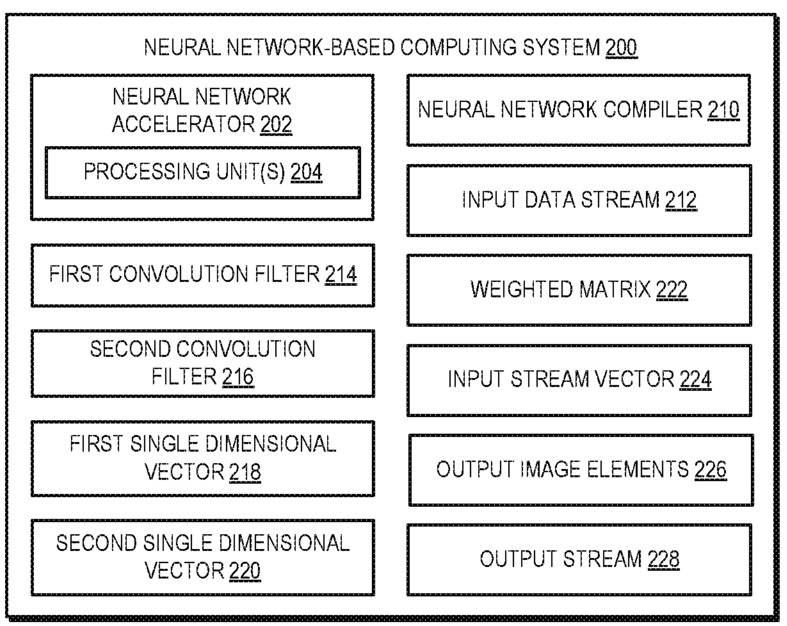
FIG. 2 illustrates a neural network-based computing system for performing convolution operations based on weighted matrix, as per another example.

Neural network-based computing systems include a neural network accelerator. A neural network accelerator may be a hardware for performing neural network or artificial intelligence related operations. Such operations may be implemented in multiple layers, with each layer capable of identifying higher level features of a corresponding input. For example, in the context of image processing, initial layers or operations may identify edges, curves, etc., while the later layers may identify recognizable features of what an image may represent. In implementing such operations, the neural network accelerator is utilized for performing complex computational tasks.

An example of a neural network-based computing systems is the Dot-Product Engine (DPE). DPE based systems include computing cores which comprise memristive crossbar arrays. The cores may be used to perform matrix-vector or dot product computations. Operation of such memristive-based systems involves providing an input voltage signal for each row of the crossbar which is weighted by the conductance of the resistive elements that may be present in each column. This produces a current output for each column that corresponds to the dot product. Although the input and output obtained is analog, they may be digitized using analog-to-digital convertors. Such memristive-based systems have high efficiency and accuracy in terms of performing complex computation tasks, such as a matrix-vector multiplication.

The neural network accelerator may support a variety of neural networks, such as a Convolution Neural Network (CNN). CNN based systems have been utilized in a variety of applications, such as image recognition. Generally, a CNN based system includes a number convolution layers. Each of such convolution layers include a number of operations, such as convolution, padding, pooling, or activation. For implementing CNN on a neural network accelerator, such operations are implemented to process input streams (e.g., images) for generating output streams in the form of constructs, such as matrices.

Generally, an input data stream is represented as a X*Y matrix onto which a convolution filter, represented by another matrix, may be applied as part of a convolution operation. Applying the filter may involve performing a dot product multiplication between the matrix representing the input data stream and the convolution filter to provide an output stream which is representative of a feature pertaining to the input data stream. The operation to be performed may be abstracted into a compute graph. A compute graph may be considered as a logical representation defining various nodes. Each of the nodes of the compute graph may represent a convolution operation that is to be performed. The compute graph may further include edges representing the operands converging onto a node. During processing, the operation defined through a node is applied onto the operands to provide an output which may be represented as an outgoing edge emanating from the node. To determine higher dimensioned features, the convolution operations have to be performed iteratively. However, such iterative processes, when abstracted, result in compute graphs which are large in size. Such large compute graphs tends to occupy large proportions of an otherwise limited amount of memory within the neural network accelerator. Furthermore, large compute graphs also tend to increase the compilation times and may reduce the efficiency of the neural network accelerator.

Approaches for performing iterative convolution operations are described. In an example, a first convolution filter and a second convolution filter, which is to be applied onto an input data stream, is obtained. Once obtained, the first convolution filter and the second convolution filter are flattened. Flattening involves, in one example, arranging the elements of a convolution filter into a single dimensional array. In the context of the present example, the first convolution filter and the second convolution filter are flattened to provide a first single dimensional vector and a second single dimensional vector, respectively. In an example, the first single dimensional vector and the second single dimensional vector may be in the form of column vector having dimension 1×M, where M is the total number of elements of the first convolution filter or the second convolution filter.

The first single dimensional vector and the second single dimensional vector may then be merged to provide a weighted matrix. In the context of the present example involving the first convolution filter and the second convolution filter, the weighted matrix may be a two-dimensional matrix (considering that two filters were involved). In another example, the weighted matrix may be of a higher dimension, depending on the number of filters that are involved.

The weighted matrix thus obtained, is applied to an input data stream vector. In an example, the input data stream vector is obtained by flattening the input data stream based on a filter window corresponding to the first convolution filter and the second convolution filter. As will be discussed later in conjunction with the accompanying figures, the size of the filter window corresponds to the dimension or size of the first convolution filter and the second convolution filter. Once applied, the input data stream is flattened to provide an input data stream vector. The input data stream vector may be in the form of a linear or a single dimensional matrix. In an example, the input data stream vector may be in the form of a column matrix with dimension N×1, where N is the total number of elements of the first convolution filter or the second convolution filter. In an example, the weighted matrix may be applied onto the input data stream vector by determining a dot product of the input data stream vector and the weighted matrix. The dot product provides a corresponding output stream.

As per the present approaches, convolution operation involving multiple convolution filters may be implemented through a single weighted matrix. Reducing a number of filters to vector matrices reduces the complexity of the convolution operation and reduces the size of the compute graphs that may be generated. This further reduces the amount of memory that is utilized and also increases the computational efficiency of the neural network accelerator for performing matrix-vector multiplication.

The above examples are further described in conjunction with appended figures. It may be noted that the description and figures merely illustrate the principles of the present subject matter. It will thus be appreciated that various arrangements that embody the principles of the present subject matter, although not explicitly described or shown herein, may be devised from the description, and are included within its scope. Moreover, all statements herein reciting principles, aspects, and examples of the present subject matter, as well as specific examples thereof, are intended to encompass equivalents thereof. In the figures, the left-most digit(s) of a reference number identifies the figure in which the reference number first appears. The same numbers are used throughout the figures to reference like features and components.

FIG. 1 illustrates an example neural network-based computing system 102 (referred to as system 102) for performing tensor operations, in accordance with an example of the present subject matter. The system 102 includes a processor 104, and a machine-readable storage medium 106 which is coupled to, and accessible by, the processor 104. The system 102 may be implemented in any computing system, such as a storage array, server, desktop or a laptop computing device, a distributed computing system, or the like. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. In an example, the processor 104 may include a neural network accelerator. Among other capabilities, the processor 104 may fetch and execute computer-readable instructions, including instructions 108, stored in the machine-readable storage medium 106. The machine-readable storage medium 106 may include any non-transitory computer-readable medium including, for example, volatile memory such as RAM, or non-volatile memory such as EPROM, flash memory, and the like. The instructions 108 may be executed to implement processing of tensor operations onto the neural network accelerator.

The neural network accelerator includes hierarchical architecture across which various computational units of the neural network-based computing systems may be present. For example, the neural network accelerator may include memristive crossbar arrays. In an example, the processor 104 may fetch and execute instructions 108. For example, as a result of the execution of the instructions 108, a plurality of convolution operations may be implemented on the memristor-crossbar array for processing an input data stream. The input data stream may correspond to digital data in the form of an N-dimensional data structure, e.g., a matrix. Continuing further, instructions 108 may be then executed to perform convolution operations on the input data stream using a weighted matrix. The weighted matrix, as will be explained, may be based on a number of convolution filters that are used for implementing a convolution operation.

In an example, the instructions 110 may be executed to obtain a first convolution filter and a second convolution filter which is to be applied to an input data stream. The first convolution filter and the second convolution filter are matrices having similar dimensions. The first convolution filter and the second convolution filter when applied result in certain effects or modifications in the input data stream. An example of such a convolution filter includes, but is not limited to, edge detection filter.

When the first convolution filter and the second convolution filter are obtained, the instructions 112 may be executed to result in flattening the first convolution filter and the second convolution filter. The flattening of the first convolution filter and the second convolution filter provides a first single dimensional vector and a second single dimensional vector. The single dimensional vector may be considered as any array of values which correspond to each of the values of the matrix which may have undergone flattening. In the context of the present example, the first single dimensional vector is an array in which each of its element corresponds to the element of the first convolution filter. In a similar manner, the second single dimensional vector is an array in which each of its element corresponds to the element of the second convolution filter.

Once the first single dimensional and the second single dimensional vector are obtained, the instructions 114 may be executed to merge the first single dimensional vector and the second single dimensional vector to provide a weighted matrix. The weighted matrix, in one example, may include the elements of the flattened first single dimensional vector and the second single dimensional vector. In an example, the weighted matrix may be written onto a processing unit of a neural network accelerator. The processing unit may include a memristor-crossbar array.

The weighted matrix thus obtained, may be then applied to an input data stream vector, as a result of the execution of instructions 116. In an example, the input data stream vector may be obtained by flattening the input data stream. With the input data stream vector obtained, the weighted matrix may be applied onto the input data stream vector to provide an element of an output stream. The above process may be applied by moving the convolution filters, i.e., the first convolution filter and the second convolution filter over the input data stream based on a stride factor. The first convolution filter and the second convolution filter may be moved across the input data stream to provide a series of output data elements. The output data elements thus obtained may be combined to provide the output data stream. The above-mentioned approaches may be implemented for additional number of convolution filters without deviating from the scope of the present subject matter.

FIG. 2 illustrates a neural network-based computing system 200 for performing convolution operations based on weighted matrix, in accordance with an example of the present subject matter. The neural network-based computing system 200 (referred to as system 200) may include a neural network accelerator 202 with a plurality of processing unit(s) 204. Although not depicted, the neural network accelerator 202 may further include a plurality of matrix-vector multiplication units for performing matrix vector multiplication. In an example, such matrix-vector multiplication units may be implemented using memristive crossbar arrays.

The neural network accelerator 202 may further include a memory (not shown in FIG. 2). The memory may be in the form of dedicated memory units within the neural network accelerator 202, or may alternately be coupled to an external memory unit, such as a flash drive, a compact disk drive, an external hard disk drive, or the like.

The system 200 may also include certain functional elements. In an example, the system 200 may include a neural network compiler 210 (referred to as compiler 210). The compiler 210 compiles, i.e., generates a machine-level executable code based on a programmable instruction provided for implementing tensor operations. Such programmable instructions may pertain to a neural network application expressed using a domain specific language (DSL), as per an example. In such instances, the DSL may be used for defining a plurality of tensors, and various tensor operations that are to be implemented. In operation, the programmable instructions in DSL may be compiled by the compiler 210 at runtime. The compiler 210 may thereafter generate an executable or corresponding machine-level executable code. Once the machine-level code is generated, it may be executed on the neural network accelerator 202. During compile time, the manner in which the various operations are to be performed are configured within the generated machine-level executable code. The machine-level executable code, when executed by a neural network accelerator 202, implements the various functionalities, as further described.

The system 200 may, during its operation, process input data stream. The input data stream may correspond to various forms of digital data, for example, digital images. The input data stream may represent such data in the form of matrices or tensors. Such matrices or tensors may be in the form of an N-dimensional data structure representing the digital data under consideration. For example, a coloured image having certain pixels may be represented as a 3-dimensional or a group of matrices with two dimensions representative of information corresponding to the longitudinally and vertically arranged pixel, with another dimension providing for channel (i.e., R, G, or B related information) corresponding to each pixel. It may be noted that higher dimensioned tensors which may pertain to image or any other forms of digital data are also possible. Such examples would also fall within the scope of the present subject matter. For the purposes of the present description, the term matrices have been used. Usage of the term matrices is not to be construed as a limitation. Approaches described with reference to matrices may be extended for tensors of any dimensions, without limiting the scope of the present subject matter in any way.

The system 200 may be utilized for performing convolution operations on the input data stream. The digital data which is to be processed by the compiler 210 is stored within the system 200 as the input data stream 212. For performing convolution operations, the compiler 210 may apply one or more convolution filters onto the input data stream 212. Convolution filters may be considered as image processing functions which may be applied onto the input data stream 212. Such functions may be utilized for processing image data within the input data stream 212. Examples of such functions include, but are not limited to, blurring, sharpening, embossing, and edge detection.

In an example, the system may implement a first convolution filter 214 and a second convolution filter 216. The first convolution filter 214 and the second convolution filter 216 may be implemented as a matrix having dimensionality which is less than the dimensionality of the matrix representing the input data stream 212. Although the present example is described with respect to the first convolution filter 214 and the second convolution filter 216, the system 200 may implement additional convolution filters, in instances where higher dimensioned features are to be determined or derived from the input data stream 212.

In operation, the compiler 210 may flatten the first convolution filter 214 and the second convolution filter 216 to provide a first single dimensional vector 218 and a second single dimensional vector 220. The first single dimensional vector 218 (referred to as the first vector 218) is an array, in which the elements correspond to the elements of the first convolution filter 214. In a similar manner, the second single dimensional vector 220 (referred as the second vector 220) is an array, in which the elements correspond to the elements of the second convolution filter 216. The first vector 218 and the second vector 220 may be considered as a matrix having either a single column or a single row. In cases where the system 200 implements additional convolution filters, the compiler 210 may generate single dimensional vectors corresponding to the respective convolution filters.

Once the first vector 218 and the second vector 220 are obtained, the compiler 210 may merge the first vector 218 and the second vector 220 to provide a weighted matrix 222. The weighted matrix 222 may be obtained by concatenating the first vector 218 and the second vector 220. The weighted matrix 222 thus obtained is such that one row of the weighted matrix 222 corresponds to the first convolution filter 214 and the other row of the weighted matrix 222 corresponds to the second convolution filter 216. Once obtained, the weighted matrix 222 may be applied and stored within the memory of the neural network accelerator 202. In an example, the weighted matrix 222 may be applied onto the processing unit(s) 204 of the neural network accelerator 202, wherein the processing unit(s) 204 may be a memristor-crossbar array.

While the weighted matrix 222 is obtained, the input data stream 212 may be processed to provide an input stream vector 224. In an example, the compiler 210 may select a first portion of the matrix of the input data stream 212 based upon the size of convolution filters that are to be applied. The selection, in the context of the convolutional-neural networks, is said to be thus performed based on a filter window. The size of the filter window (and thus the portion of the input data stream 212) selected corresponds to the dimensionality of the convolution filter being considered. For example, if the first convolution filter 214 is a 3*3 matrix, the first portion may correspond to notional 3*3 matrix originating from the first element of the input data stream 212.

With the first portion thus determined, the compiler 210 may derive each element of the first portion and arrange them in an array. In an example, the compiler 210 may generate a vector (i.e., a row or a column matrix) corresponding to each channel of the input data stream 212. Continuing with the example as discussed previously, an array for each channel will possess 9 elements, corresponding to the elements of the first portion. Once the vector corresponding to each channel is obtained, the compiler 210 may concatenate the channel-vectors to form a consolidated vector, referred to as the input stream vector 224.

Once the input stream vector 224 is obtained, it may be processed based on the weighted matrix 222 written to the processing unit(s) 204. In an example, the compiler 210 may perform a matrix multiplication of the input stream vector 224 and the weighted matrix 222 to provide output image elements 226. The output image elements 226 may be an array which includes elements obtained by the vector multiplication of the weighted matrix 222 and the input stream vector 224. The number of elements of the output image elements 226 may be based on the number of convolution filters.

The above process may be repeated by further translating the filter window (referred to as striding) across the matrix input data stream 212. Each of such stride cycle may result in initially selecting a subsequent portion, generating a corresponding input stream vector 224, and generating an output image elements 226. The output image elements 226 are such that various sets of the output image elements 226 may correspond to the different convolution filters which were considered. In the context of the present example, a first set of output image elements 226 may be elements corresponding to the first convolution filter 214, and a second set of output image elements 226 may be elements corresponding to the second convolution filter 216. In an example, the translation of the filter window across the entire input data stream 212 may be based on a stride factor. For example, for a stride factor of one (1), the filter window is to move by one element. The movement of the filter window may be either along the rows or columns of the input data stream 212, without deviating from the scope of the present subject matter. In a similar manner, the filter window may move by two elements (i.e., for a stride factor of 2). Variation in the stride factor increases or decreases the density of features which are derived as a result of the convolution operation.

Continuing further, once the filter window has translated across the entire matrix corresponding to the input data stream 212, the plurality of output image elements 226 are arranged to provide a layered output stream 228. In an example, the layered output stream 228 may include layers or channels which may correspond to the convolution filters that were initially considered. For example, the output stream 228 may include two channels or layers, with the first layer corresponding to the first convolution filter 214 and the second layer corresponding to the second convolution filter 216. In case of additional convolution filters, the output stream 228 may include corresponding additional layers. The output stream 228 is such that it provides a representation or an output indicating certain features pertaining to the input data stream 212. For example, in case the first convolution filter 214 is an edge detection filter, the output stream 228 may represent points in a digital image at which the image brightness has discontinuities. In a similar manner, the output stream 228 may represent features pertaining to the convolution filter which has been used for convolution. The approaches as described enabling performing convolution operation involving multiple or higher dimensioned filters in a computationally efficient manner.

Figure 3:
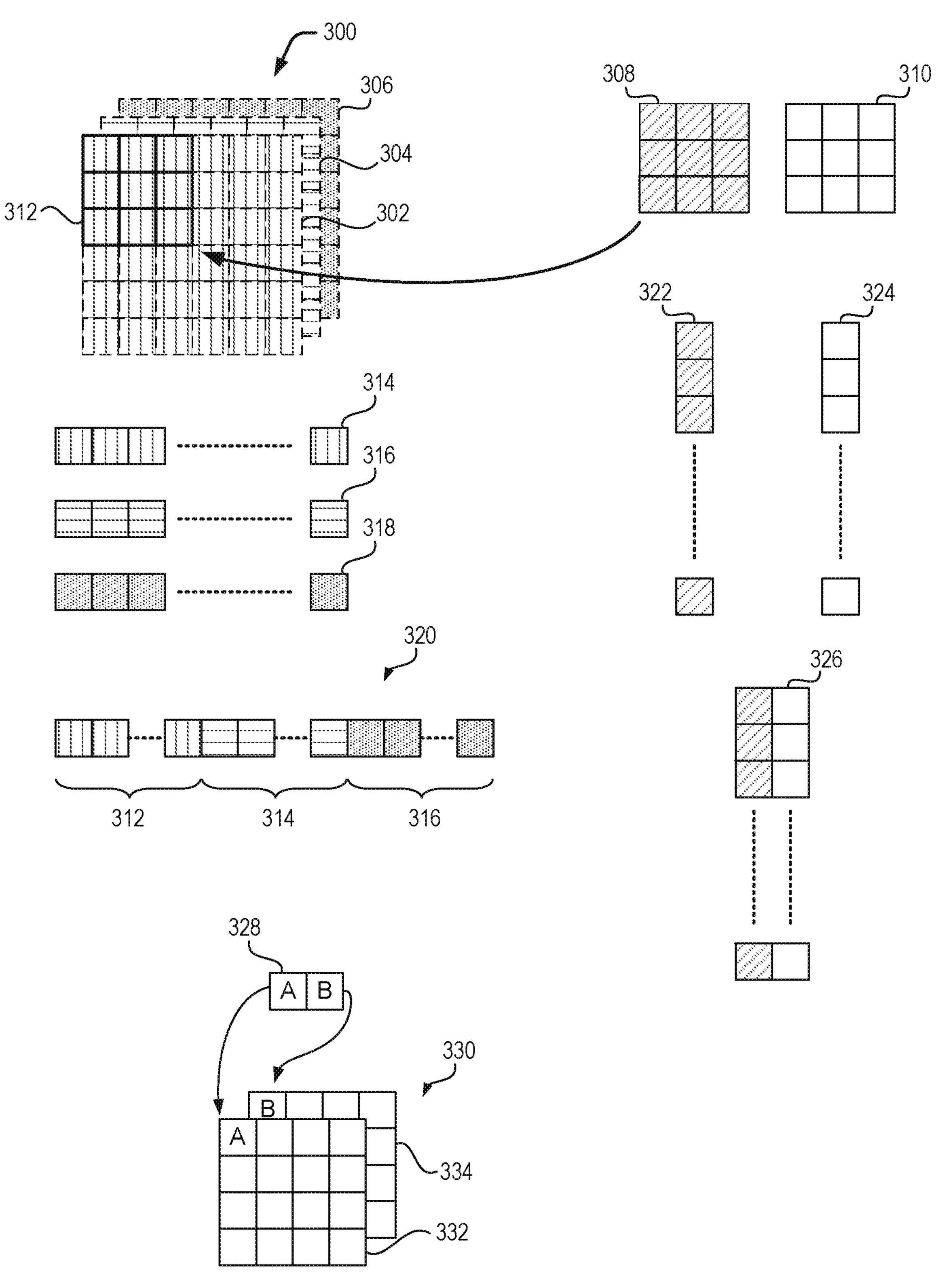
FIG. 3 illustrates a block diagram depicting the input data stream and convolution filters, as per an example.

FIG. 3 illustrates the above approaches for performing a convolution operation on an input data stream (such as the input data stream 300) depicted as a matrix. The input data stream, in the present example is referred to as the input data stream 300. The input data stream 300, as depicted in the present figure, may include multiple layers or channels. For example, the input data stream 300 is depicted as having 6*6*3 dimensions, having three channels 302, 304, and 306. In the present example, the input data stream 300 may be processed based on a first convolution filter 308 and a second convolution filter 310. The first convolution filter 308 and the second convolution filter 310, in an example, are similar to the first convolution filter 214 and the second convolution filter 216, as discussed in conjunction with the previous figures. The first convolution filter 308 (which may be similar to the first convolution filter 214) and the second convolution filter 310 (which may be similar to the second convolution filter 216) may correspond to certain feature related operations which are to be performed. In the present example, the first convolution filter 308 and the second convolution filter 310 are both convolution filters having 3*3 dimensionality.

The input data stream 300 may be processed to provide an input stream vector. In an example, the input stream vector may be determined for each of the channels 302, 304, and 306. In an example, a first portion of the input data stream 300 may be selected based on a size of convolution filters that are to be applied. The selection, in the context of the convolutional-neural networks, is said to be thus performed based on a filter window, which in the present example is depicted as the filter window 312. As discussed in conjunction with the previous figure, the size of the filter window 312 corresponds to the dimensionality of the first convolution filter 308 and the second convolution filter 310. In the present example, since the first convolution filter 308 and the second convolution filter 310 are 3*3 matrices, the filter window 312 that is to be applied is to select elements which correspond to notional 3*3 matrix positioned from the first element of the input data stream 300. The first portion is depicted as overlapping the filter window 312 for the channel 302.

Thereafter, for channel 302, the elements of the first portion are retrieved to provide a first single dimensional vector 314 (referred to as the first image vector 314) corresponding to the channel 302. An image vector, in the context of the present example, may be a row matrix in which various element of the first portion selected by the filter window 312 are arranged. Although depicted as a row matrix, the first image vector 314 may be a column matrix without deviating from the scope of the present subject matter. In a similar manner, a corresponding second portion may be selected for the second channel 304 and the third channel 306. Thereafter, the second portion from the second channel 304 is selected, a corresponding second image vector 316 may be determined. In a similar manner, based on a third portion of the third channel 306, a third image vector 318 may be obtained. In an example, the first image vector 314, the second image vector 316 and the third image vector 318 may be generated by the compiler 210.

Once the first image vector 314, the second image vector 316 and the third image vector 318 are obtained, they may be combined to form an input stream vector 320 (similar to the input stream vector 224). In an example, the input stream vector 320 may be obtained by concatenating the first image vector 314, the second image vector 316, and the third image vector 318. The input stream vector 320, thus generated, includes elements corresponding to the first, second and third portions of the first channel 302, second channel 304, and the third channel 306. In the context of the present example, wherein the size of the filter window 312 applied was 3*3, the resulting number of elements of the first image vector 314, the second image vector 316, and the third image vector 318 would each be nine (9). The resulting input stream vector 320, therefore, obtained upon concatenating the first image vector 314, the second image vector 316, and the third image vector 318, would include twenty-seven (27) elements. As explained previously, the elements in the input stream vector 320 correspond to the elements of the first, second, and third portion of the channels 302, 304, and 306. In the context of the present example, the input stream vector 320 has a dimensionality of 1*27.

In parallel, the first convolution filter 308 and the second convolution filter 310 may also be further processed. In an example, the first convolution filter 308 and the second convolution filter 310 may be flattened, say by the compiler 210. The first convolution filter 308 upon flattening may result in the first single dimensional filter vector 322 (referred to as the first filter vector 322). In a similar manner, the flattening of the second convolution filter 310 may result in a second single dimensional filter vector 324 (referred to as the second filter vector 324). The first filter vector 322 and the second filter vector 324 have been depicted as a column matrix, but may be implemented as a row matrix without deviating from the scope of the present subject matter. In instances where the first filter vector 322 and the second filter vector 324 are obtained as column matrices, the first vector 314, the second vector 316 and the third vector 318 (and hence the input stream vector 320) may be in the form of a row matrices.

The first filter vector 322 and the second filter vector 324 may then be combined to provide a weighted matrix 328 (similar to the weighted matrix 222). The weighted matrix 326 may be obtained by combining the first filter vector 322 and the second filter vector 324 along their respective lengths. The weighted matrix 326 thus obtained is such that one row of the weighted matrix 326 corresponds to the first convolution filter 308 and the other row of the weighted matrix 326 corresponds to the second convolution filter 310. With the weighted matrix 326 obtained, it may be applied and stored within the memory of the neural network accelerator, such as the neural network accelerator 202. In an example, the weighted matrix 326 may be applied onto the processing unit(s) 204 of the neural network accelerator 302, wherein the processing unit(s) 204 may be a memristor-crossbar array. In the context of the present example, since the dimensionality of the first convolution filter 308 and the second convolution filter 310 is 3*3, the resulting weighted matrix 326 has a dimensionality of 27*2.

With the weighted matrix 326 thus obtained, it may be applied onto the input stream vector 320. In an example, the compiler 210 may perform a matrix multiplication of the input stream vector 320 and the weighted matrix 326 to provide an output image element 328. The output image element 328 may be an array which includes elements obtained by the vector multiplication of the weighted matrix 326 and the input stream vector 320. The number of elements of the output image elements 328 may be based on the number of convolution filters. In the context of the present example, since the input stream vector 320 is 1*27 matrix, and the weighted matrix 326 is 27*2 matrix, the resulting output image element 328 would be a 1*2 matrix. The output image element 328 may include elements A and B, wherein the element A corresponds to an output image value associated with the first convolution filter 308, and the element B corresponds to an output image value associated with the second convolution filter 310.

The above process may be repeated by further translating the filter window 312 across the matrix input data stream 300 based on a stride factor. As the filter window 312 translates across the input data stream 300, corresponding input stream vectors, similar to the input stream vector 320 may be generated. Thereafter, subsequent output image elements such as the output image element 328 may be generated. Continuing further, once the filter window 312 has translated across the entire matrix corresponding to the input data stream 300, the plurality of output image elements 328 are arranged to provide a layered output stream 330. In an example, the layered output stream 330 may include layers which in turn may correspond to different convolution filters that were initially considered. In the present example, layered output stream 330 includes output layers 332, 334, with the layer 332 corresponding to the first convolution filter 308, and with the layer 334 corresponding to the second convolution filter 310.

The layered output stream 330 may represent the features which correspond to the first convolution filter 308 and the second convolution filter 310. For example, in case the first convolution filter 308 is an edge detection filter, the layered output stream 330 may represent points in a digital image at which the image brightness has discontinuities. Other layers of the layered output stream 330 may represent any other features pertaining to the convolution filter which has been used for convolution. In this manner, higher dimensioned features may be determined in a computationally efficient manner and without undue recursive cycles.

Figure 4:
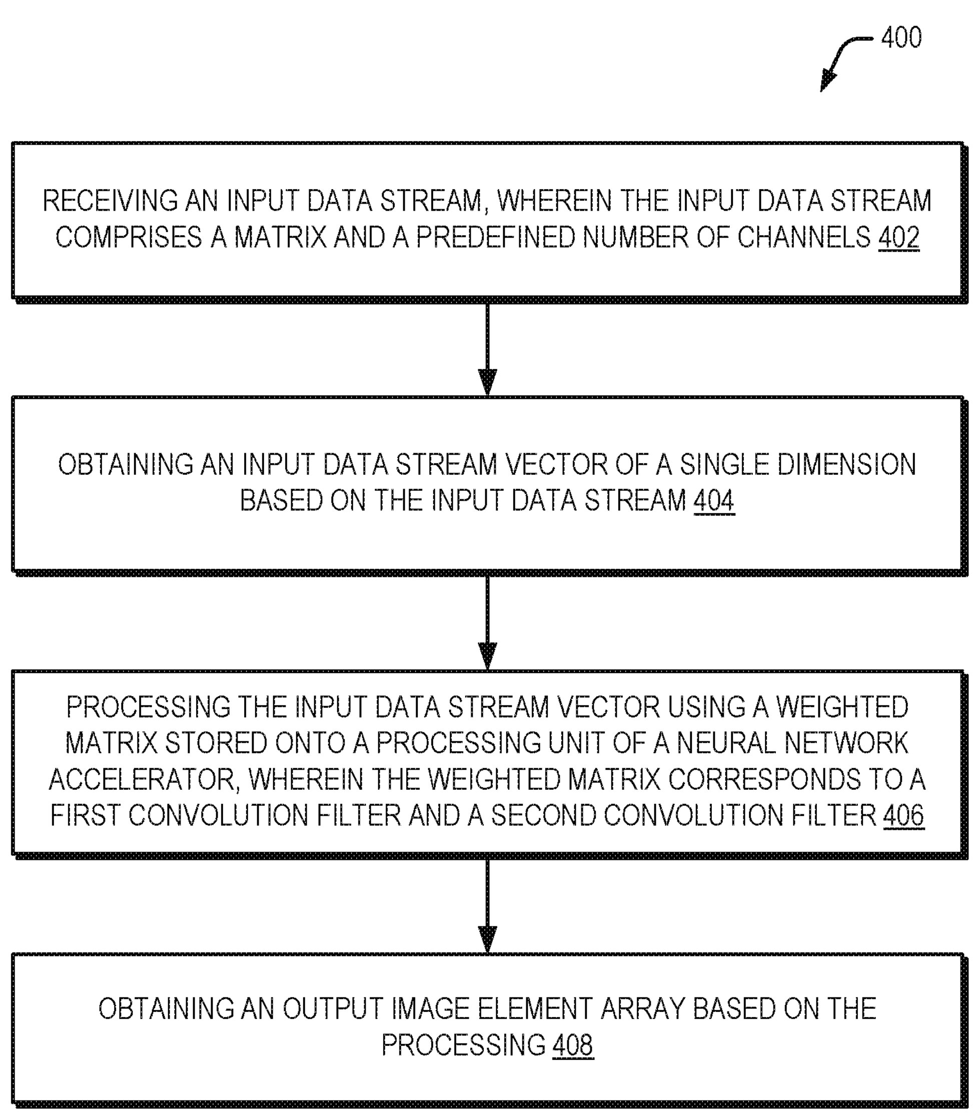
FIG. 4 illustrates a method for performing convolution operations based on weighted matrix, as per an example.
Figure 5:
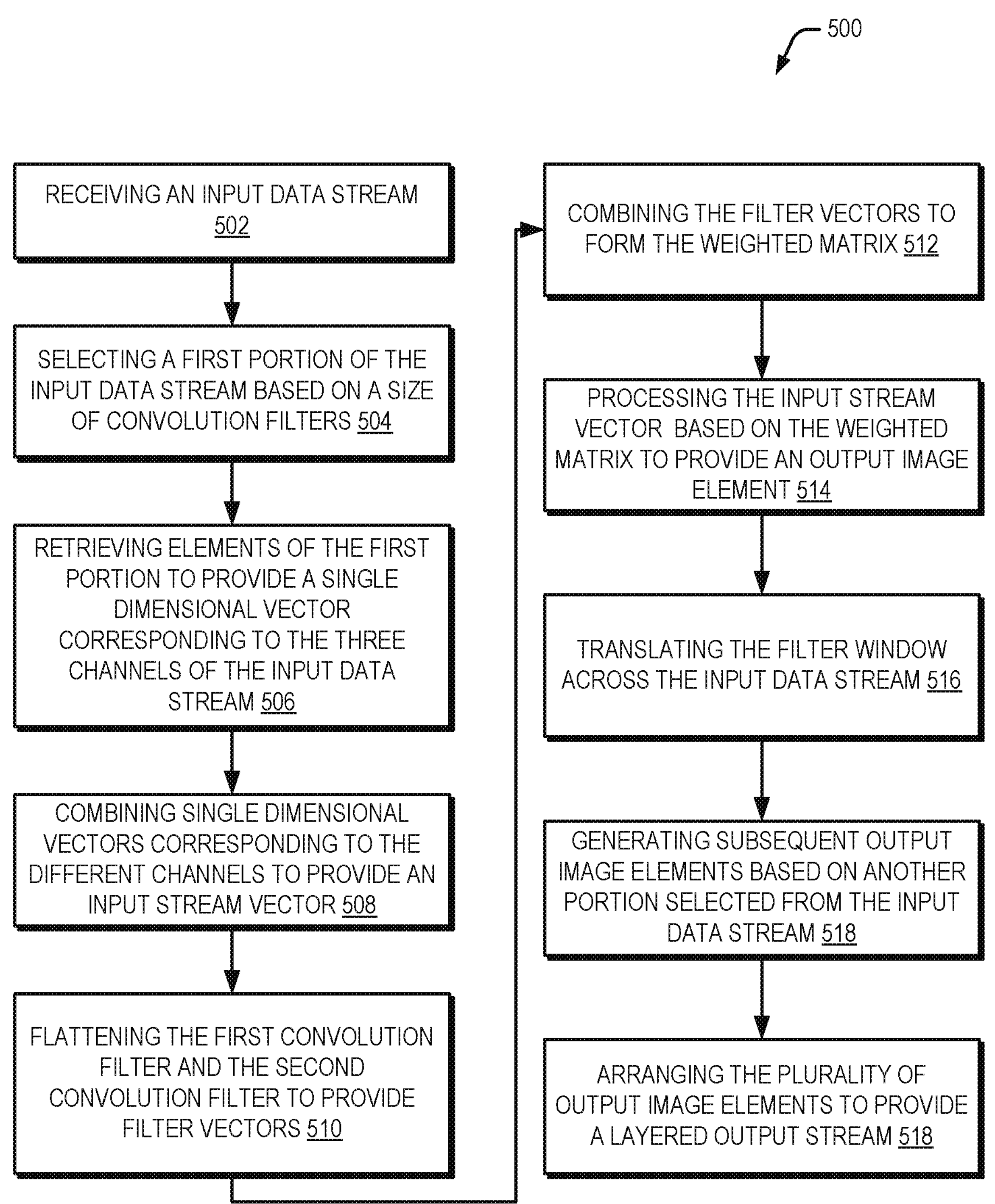
FIG. 5 illustrates a method for performing convolution operations based on weighted matrix, as per another example.

FIGS. 4-5 illustrate example methods 400-500 for performing convolution operations based on weighted matrix, in accordance with an example of the present subject matter. The order in which the above-mentioned methods are described is not intended to be construed as a limitation, and some of the described method blocks may be combined in a different order to implement the methods, or alternative methods.

Furthermore, the above-mentioned methods may be implemented in any suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by the one of systems 102 or 200. In an implementation, the methods may be performed under an "as a service" delivery model, where the system 102, 200, operated by a provider, receives programmable code in domain specific language for performing one or more tensor operations, using a neural network accelerator, such as the neural network accelerator 202. Herein, some examples are also intended to cover non-transitory computer readable medium, for example, digital data storage media, which are computer readable and encode computer-executable instructions, where said instructions perform some or all the steps of the above-mentioned methods.

In an example, the method 400 may be implemented by system 102 for performing convolution operations based on weighted matrix, in accordance with an example of the present subject matter. At block 402, an input stream may be received. The received input stream may be an X*Y matrix and may include a predefined number of channels. For example, the input data stream 212 (or the input data stream 300) may be in the form of a matrix wherein each element corresponds to certain pixels. In an example, the input data stream 212 may further include channels 302, 304, 306, which may provide color related information (i.e., R, G, or B related information).

At block 404, an input data stream vector is obtained based on the input data stream. For example, the compiler 210 may generate an input stream vector 224 based on the input data stream 212. To this end, the compiler 210 may elect a first portion of the matrix of the input data stream 212 based upon the size of convolution filters that are to be applied. With the first portion thus determined, the compiler 210 may derive each element of the first portion and arrange the same in an array. The above process may be performed for each of the channels. Once the vector corresponding to each channel is obtained, the compiler 210 may concatenate the channel-vectors to form a consolidated vector, referred to as the input stream vector 224.

At block 406, the input data stream vector may be processed using a weighted matrix. The weighted matrix in turn may be written onto a processing unit of a neural network accelerator. In an example, the compiler 210 may perform a matrix multiplication of the input stream vector 224 and the weighted matrix 222.

At block 408, an output image element is obtained. For example, the compiler 210 as a result of the matrix multiplication of the input stream vector 224 and the weighted matrix 222 may generate output image elements 226. The output image elements 226 may be an array which includes elements obtained by the vector multiplication of the weighted matrix 222 and the input stream vector 224. The number of elements of the output image elements 226 may be based on the number of convolution filters. In another example, the above process may be repeated by further translating the filter window across the matrix input data stream 212, and generate further output image elements 226, based on which a layered output stream 228 may be obtained.

FIG. 5 illustrates another example method 500 for performing convolution operations based on weighted matrix, in accordance with an example of the present subject matter. The method 500 may be implemented by neural network-based computing system 200 for performing convolution operations based on weighted matrix, in accordance with an example of the present subject matter. In an example, the neural network-based computing system may further include a neural network accelerator. The neural network accelerator may further be implemented using a memristive crossbar array.

At block 502, an input data stream may be received. In an example, the input data stream may be denoted as input data stream 300. The input data stream 300 may have 6*6*3 dimensions, having three channels 302, 304, and 306. Each of the channels may depict color information which may be associated with the input data stream 300. The input data stream 300, as discussed in the present method, may be processed based a first convolution filter 308 and a second convolution filter 310.

At block 504, a first portion of the input data stream may be selected based on a size of convolution filters. The input data stream is to be processed based on the convolution filters. For example, a compiler 210 may select a first portion of the input data stream 300 based on a filter window 312. In an example, the size of the filter window 312 is based on the dimensionality of the first convolution filter 308 and the second convolution filter 310. The selection of the first portion is performed for the first channel 302.

At block 506, elements of the first portion are retrieved to provide a single dimensional vector corresponding to the three channels of the input data stream. For example, the compiler 210 may retrieve the elements of the first portion to provide the first vector 314 corresponding to the channel 302. As described previously, the image vector may be a row matrix in which various element of the first portion selected by the filter window 312, are arranged to provide the first vector 314. Thereafter, the second portion from the second channel 304 is selected, a corresponding second image vector 316 may be determined. In a similar manner, based on a third portion of the third channel 306, a third image vector 318 may be obtained. In an example, the first image vector 314, the second image vector 316 and the third image vector 318 may be generated by the compiler 210.

At block 508, the single dimensional vectors corresponding to the different channels may be combined to provide an input stream vector. For example, once the first image vector 314, the second image vector 316 and the third image vector 318 are obtained, the compiler 210 may combined them to form an input stream vector 320. The input stream vector 320 may be obtained by concatenating the first image vector 314, the second image vector 316, and the third image vector 318, and may include elements corresponding to the first, second and third portions of the first channel 302, second channel 304, and the third channel 306. In the context of the present example, the input stream vector 320 has a dimensionality of 1*27.

At block 510, the first convolution filter and the second convolution filter may be flattened to provide filter vectors. For example, the first convolution filter 308 and the second convolution filter 310 may be flattened by the compiler 210. The first convolution filter 308 upon flattening may result in the first filter vector 322. In a similar manner, the flattening of the second convolution filter 310 may result in the second filter vector 324.

At block 512, the filter vectors may be combined to form the weighted matrix. For example, the first filter vector 322 and the second filter vector 324 may then be combined to provide a weighted matrix 326. In an example, the weighted matrix 326 may be obtained by combining the first filter vector 322 and the second filter vector 324 along their respective lengths. The weighted matrix 326 thus obtained such that one row of the weighted matrix 326 corresponds to the first convolution filter 308 and the other row of the weighted matrix 326 corresponds to the second convolution filter 310. In an example, the weighted matrix 326 may be stored within the processing unit(s) 204 of the neural network accelerator 202. In an example, the processing unit(s) 204 may be a memristor-crossbar array.

At block 514, the input stream vector is processed based on the weighted matrix to provide an output image element. For example, the compiler 210 may apply the weighted matrix 326 onto the input stream vector 320. To this end, the compiler 210 may perform a matrix multiplication of the input stream vector 320 and the weighted matrix 326 to provide an output image element 328. The output image element 328 may be an array which includes elements obtained by the vector multiplication of the weighted matrix 326 and the input stream vector 320. The number of elements of the output image elements 328 may be based on the number of convolution filters. In the context of the present example, since the input stream vector 320 is 1*27 matrix, and the weighted matrix 326 is 27*2 matrix, the resulting output image element 328 would be a 1*2 matrix.

At block 516, the filter window may be translated across the input data stream. For example, the method described in the preceding blocks may be performed for other portions of the input data stream. In an example, the filter window 312 may be translated across the matrix input data stream 300 based on a stride factor.

At block 518, subsequent output image elements may be generated based on another portion selected from the input data stream. For example, based on the translation of the filter window 312 translates across the input data stream 300, corresponding input stream vectors, similar to the input stream vector 320 may be generated. Thereafter, subsequent output image elements such as the output image element 328 may be generated. Continuing further, once the filter window 312 has translated across the entire matrix corresponding to the input data stream 300, a plurality of output image elements 328, are obtained.

At block 520, the plurality of output image elements are arranged to provide a layered output stream. For example, the compiler 210 may arrange the plurality of output image elements 328 to provide a layered output stream 330. The layered output stream 330 thus obtained may include output layers 332, 334 which may correspond to the first convolution filter 308 and the second convolution filter 310. In an example, the layered output stream 330 may be considered to represent the appropriate features which in turn, correspond to the first convolution filter 308 and the second convolution filter 310.

Figure 6:
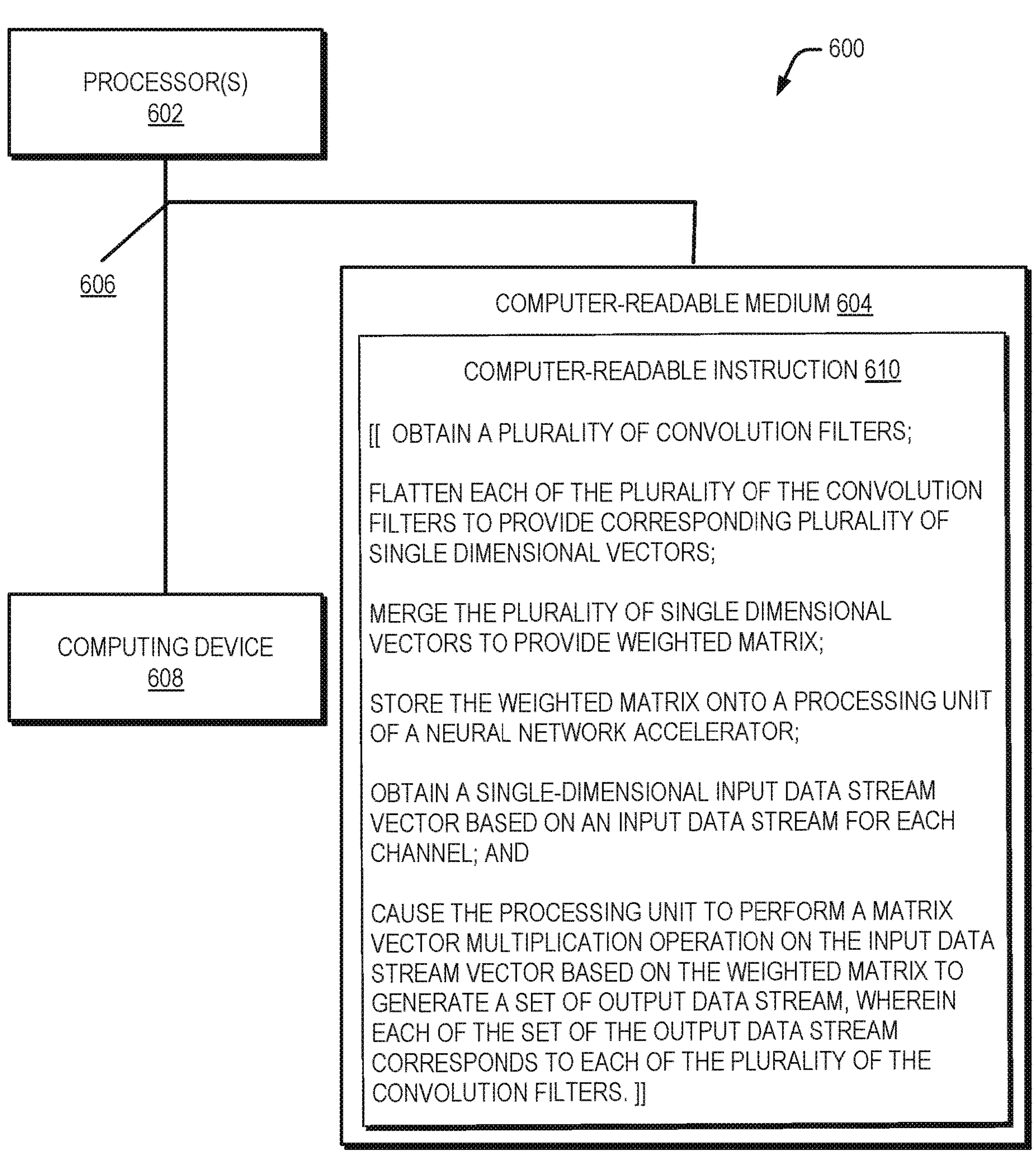
FIG. 6 illustrates a system environment implementing a non-transitory computer readable medium for performing tensor operations, as per an example.

FIG. 6 illustrates a computing environment 600 implementing a non-transitory computer readable medium for performing convolution operations based on weighted matrix, by a neural network-based computing system 200, as per an example. In an example, the computing environment 600 includes processor(s) 602 communicatively coupled to a non-transitory computer readable medium 604 through a communication link 606. In an example implementation, the computing environment 600 may be for example, the system 200. In an example, the processor(s) 602 may have one or more processing resources for fetching and executing computer-readable instructions from the non-transitory computer readable medium 604. The processing resource may be neural network accelerator, such as a neural network accelerator 202. The processor(s) 602 and the non-transitory computer readable medium 604 may be implemented, for example, in system 200 (as has been described in conjunction with the preceding figures) as processing unit(s) 204.

The non-transitory computer readable medium 604 may be, for example, an internal memory device or an external memory device. In an example implementation, the communication link 606 may be a network communication link. The processor(s) 602 and the non-transitory computer readable medium 604 may also be communicatively coupled to a computing device 608 over the network.

In an example implementation, the non-transitory computer readable medium 604 includes a set of computer readable instructions 610 which may be accessed by the processor(s) 602 through the communication link 606. Referring to FIG. 6, in an example, the non-transitory computer readable medium 604 includes instructions 610 that cause the processor(s) 602 to obtain a plurality of convolution filters, such as the first convolution filter 214 and the second convolution filter 216. Once the first convolution filter 214 and the second convolution filter 216 are obtained, the instructions 610 may cause the processor(s) 602 to flatten the convolution filters, i.e., the first convolution filter 214 and the second convolution filter 216, to provide corresponding plurality of single dimensional vectors. The single dimensional vectors may be such that they correspond to the first convolution filter 214 and the second convolution filter 216. In an example, the instructions 610 may cause the processor(s) 602 to provide a first vector 218 and a second vector 220.

Thereafter, the instructions 610 may cause the processor(s) 602 to merge the plurality of single dimensional vectors, i.e., the first vector 218 and the second vector 220 to provide weighted matrix, such as the weighted matrix 222. The weighted matrix 222 may then be stored onto the processing unit, such as the processing unit(s) 204, of the neural network accelerator. With the weighted matrix 222 obtained, the instructions 610 may be executed to further cause the processor(s) 602 to obtain a single-dimensional input data stream vector, i.e., input stream vector 224, based on an input data stream, such as the input data stream 212, for each channel. Once the weighted matrix 222 and the input stream vector 224 are obtained, the instructions 610 may be executed to further cause the processor(s) 602 to perform a matrix vector multiplication operation on the input data stream vector, i.e., the input stream vector 224, based on the weighted matrix, i.e., weighted matrix 222. As a result of the matrix vector multiplication, a set of output image elements, i.e., output image element 226 based on which layered output stream 228 is obtained.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A system comprising:

a neural network accelerator;

a processor;

a machine-readable storage medium comprising machine-level instructions executable by the processor to:

receive an input data stream comprising a plurality of channels, wherein each channel of the plurality of channels comprises a respective matrix of image data of the input data stream;

process the image data of the input data stream, by:

flattening at least a portion of the respective matrix of each channel of the plurality of channels to obtain a respective plurality of single dimension input data vectors; and combining the respective plurality of single dimension input data vectors to obtain a single dimension input data stream vector;

while processing the image data of the input data stream, generate a weighted matrix for convolutional processing of the image data of the input data stream, by:

obtaining a first convolution filter and a second convolution filter;

flattening the first convolution filter and the second convolution filter to obtain a first single dimensional vector and a second single dimensional vector;

combining the first single dimensional vector and the second single dimensional vector to obtain the weighted matrix;

storing the weighted matrix in a memory of the neural network accelerator; and applying the weighted matrix to a memristor crossbar array of a processing unit of the neural network accelerator;

perform the convolutional processing, comprising at least one of: blurring, sharpening, embossing, or edge detection of the image data of the input data stream, by performing a matrix vector multiplication operation to generate an output element array, wherein the matrix vector multiplication operation comprises applying the weighted matrix applied to the memristor crossbar array of the processing unit to the single dimension input data stream vector; and generate a layered output stream comprising a first layer output corresponding to the first convolution filter and a second layer output corresponding to the second convolution filter, by storing a first portion of the output element array associated with the first convolution filter in the first layer output and storing a second portion of the output element array associated with the second convolution filter in the second layer output.

2. The system as claimed in claim 1, wherein the machine-readable storage medium comprises machine-level instructions executable by the processor to:

obtain a subsequent single dimensional vector based on a subsequent convolution filter; and merge the subsequent single dimensional vector with the first single dimensional vector and the second single dimensional vector to provide the weighted matrix.

3. The system as claimed in claim 1, wherein the plurality of channels comprises a predefined number of channels.

4. The system as claimed in claim 1, wherein the matrix vector multiplication operation comprises a dot product of the single dimension input data stream vector and the weighted matrix.

5. The system as claimed in claim 1, wherein the output element array comprises a first element and a second element, wherein the first element corresponds to the first convolution filter and the second element corresponds to the second convolution filter.

6. The system as claimed in claim 5, wherein the first element and the second element are implemented within a first output matrix and a second output matrix, respectively.

7. The system as claimed in claim 1, wherein the portion of the respective matrix of each channel of the plurality of channels is based on a filter window corresponding to a size of the first convolution filter and the second convolution filter.

8. The system as claimed in claim 3, wherein the predefined number of channels of the input data stream is equal to a number of channels of the first convolution filter and the second convolution filter.

9. The system as claimed in claim 1, comprising:

a neural network compiler that generates the machine-level instructions from programmable instructions expressed using a domain specific language (DSL);

wherein the processing unit is a memristor crossbar array-based processing unit.

10. A method comprising:

receiving, via processing circuitry, an input data stream, wherein the input data stream comprises image data comprising a respective matrix for each of a plurality of channels, the plurality of channels comprising a predefined number of channels;

processing the image data, by:

flattening at least a portion of the respective matrix for each channel of the plurality of channels to obtain a respective plurality of single dimension input data vectors, wherein each respective single dimension input data vector of the plurality of single dimension input data vectors corresponds to a respective channel of the plurality of channels; and combining the respective plurality of single dimension input data vectors to obtain an input data stream vector, wherein the input data stream vector is a single dimension vector comprising data values corresponding to each of the plurality of channels;

while processing the image data;

generating a weighted matrix for convolution processing of the image data, the weighted matrix comprising a combination of a first single dimension filter vector of a first convolution filter and a second single dimension filter vector of a second convolution filter;

storing the weighted matrix in a memory of a neural network accelerator; and applying the weighted matrix to a memristor crossbar array of a processing unit of the neural network accelerator;

performing the convolutional processing of the image data to perform at least one of blurring, sharpening, embossing, or edge detection of the input data stream vector by performing a matrix vector multiplication operation comprising applying the weighted matrix applied to the memristor crossbar array of the processing unit to the input data stream vector;

obtaining an output element array based on the convolutional processing of the image data; and generating a layered output stream comprising a first layer output corresponding to the first convolution filter and a second layer output corresponding to the second convolution filter, by storing a first portion of the output element array associated with the first convolution filter in the first layer output and storing a second portion of the output element array associated with the second convolution filter in the second layer output.

11. The method as claimed in claim 10, wherein the input data stream vector is obtained based on a filter window corresponding to a size of the first convolution filter and the second convolution filter.

12. The method as claimed in claim 11, wherein flattening the portion of the respective matrix for each channel of the plurality of channels comprises:

selecting a first set of elements of a first respective matrix of a first channel of the plurality of channels based on the filter window, wherein the filter window is multi-dimensional;

reformatting the first set of elements into a first single dimension input vector of the plurality of single dimension input data vectors;

selecting a second set of elements of a second respective matrix of a second channel of the plurality of channels based on the filter window; and reformatting the second set of elements into a second single dimension input vector of the plurality of single dimension input data vectors.

13. The method as claimed in claim 12, comprising:

selecting a subsequent set of elements of the first respective matrix based on the filter window and a stride factor;

reformatting the subsequent set of elements into a subsequent single dimension input vector;

obtaining a subsequent input data stream vector based on the subsequent single dimension input vector; and processing the subsequent input data stream vector using the weighted matrix; and obtaining a subsequent output element array based on the processing.

14. The method as claimed in claim 10, wherein the predefined number of channels of the input data stream is equal to the number of channels of the first convolution filter and the second convolution filter.

15. The method as claimed in claim 10, wherein the weighted matrix is obtained by:

flattening the first convolution filter and the second convolution filter to the first single dimension filter vector and the second single dimension filter vector, respectively; and combining the first single dimension filter vector and the second single dimension filter vector to obtain the weighted matrix, wherein the weighted matrix comprises a two dimensional matrix.

16. The method as claimed in claim 10, wherein processing the input data stream vector comprises determining a dot product of the input data stream vector and the weighted matrix.

17. A non-transitory computer-readable medium comprising instructions for performing a convolution operation using a neural network accelerator, the instructions being executable by a processing resource to:

obtain a plurality of convolution filters;

flatten each convolution filter of the plurality of the convolution filters to obtain a corresponding plurality of single dimensional filter vectors;

merge the plurality of single dimensional filter vectors to obtain a weighted matrix for convolutional processing of image data, the convolutional processing comprising at least one of: sharpening, embossing, or edge detection of the image data;

store the weighted matrix onto a processing unit of the neural network accelerator;

apply the weighted matrix to a memristor crossbar array of the processing unit of the neural network accelerator;

obtain an input data stream comprising a plurality of channels, wherein each channel of the plurality of channels comprises a respective matrix of the input data stream;

flatten at least a portion of the respective matrix of each channel of the plurality of channels to obtain a respective plurality of single dimension input data vectors, wherein each respective single dimension input data vector of the plurality of single dimension input data vectors corresponds to a respective channel of the plurality of channels;

merge the respective plurality of single dimension input data vectors to obtain an input data stream vector, wherein the input data stream vector is a single dimension vector comprising data values corresponding to each of the plurality of channels;

cause the processing unit to perform the convolutional processing, by performance of a matrix vector multiplication operation on the input data stream vector based on the weighted matrix applied to the memristor crossbar array to generate a set of output data streams, wherein each of the set of the output data streams corresponds to each of the plurality of the convolution filters; and generate a layered output stream comprising a first layer output corresponding to a first convolution filter of the plurality of convolution filters and a second layer output corresponding to a second convolution filter of the plurality of convolution filters, by storing a first portion of an output element array associated with the first convolution filter in the first layer output and storing a second portion of the output element array associated with the second convolution filter in the second layer output.

18. The computer-readable medium as claimed in claim 17, wherein flattening the portion of the respective matrix for each channel of the plurality of channels comprises:

selecting a first set of elements of a first respective matrix of a first channel of the plurality of channels based on a filter window, wherein the filter window is multidimensional;

reformatting the first set of elements into a first single dimension input vector of the plurality of single dimension input data vectors;

selecting a second set of elements of a second respective matrix of a second channel of the plurality of channels based on the filter window; and reformatting the second set of elements into a second single dimension input vector of the plurality of single dimension input data vectors.

19. The computer-readable medium as claimed in claim 17, wherein the input data stream corresponds to a digital image having three channels.

20. The computer-readable medium as claimed in claim 19, wherein each of the plurality of convolution filters comprises three channels.

* * * * *